(12) United States Patent　(10) Patent No.: US 12,594,795 B2

Martínez Alejo et al.　(45) Date of Patent:　Apr. 7, 2026

(54) TYRE SUPPORT DEVICE

(71) Applicant: METADATIA TECHNOLOGIES S.L., Elche (ES)

(72) Inventors: Juan Martínez Alejo, Aspe (ES); Juan José Llombart Gavalda, Aspe (ES)

(73) Assignee: VRAIA CORP, S.L., ASPE (ES)

( * ) Notice: Subject to any disclaimer, the term of this patent is extended or adjusted under 35 U.S.C. 154(b) by 582 days.

(21) Appl. No.: 17/910,644

(22) PCT Filed: Dec. 29, 2020

(86) PCT No.: PCT/ES2020/070825

§ 371 (c)(1),
(2) Date: Sep. 9, 2022

(87) PCT Pub. No.: WO2021/180986

PCT Pub. Date: Sep. 16, 2021

(65) Prior Publication Data

US 2023/0150318 A1　May 18, 2023

(30) Foreign Application Priority Data

Mar. 12, 2020　(EP) ..................................... 20382185

(51) Int. Cl.
B60C 25/00　(2006.01)
G01M 17/02　(2006.01)

(52) U.S. Cl.
CPC ......... B60C 25/002 (2013.01); G01M 17/021 (2013.01)

(58) Field of Classification Search
CPC . B60C 25/002; G01M 17/021; G01M 17/022; G01M 17/027

USPC ................................................ 157/14, 16–20
See application file for complete search history.

(56) References Cited

U.S. PATENT DOCUMENTS

| | | | | | |
|---|---|---|---|---|---|
| 3,843,000 | A | * | 10/1974 | Bennett | B05C 13/025 |
| | | | | | 118/500 |
| 3,937,343 | A | * | 2/1976 | Spulak | B25H 5/00 |
| | | | | | 414/428 |
| 4,293,120 | A | * | 10/1981 | Robins | B60C 25/142 |
| | | | | | 254/50.2 |
| 5,219,012 | A | * | 6/1993 | Corghi | B60C 25/132 |
| | | | | | 157/19 |
| 7,699,087 | B2 | * | 4/2010 | Rogalla | B60C 25/0596 |
| | | | | | 157/1.1 |
| 8,661,645 | B2 | * | 3/2014 | Lemser | G01M 17/021 |
| | | | | | 73/146 |
| 8,973,639 | B2 | * | 3/2015 | Lawson | B60C 25/0533 |
| | | | | | 157/1.1 |
| 2011/0188052 | A1 | | 8/2011 | Sotgiu | |

FOREIGN PATENT DOCUMENTS

DE　20 2006 011 739 U1　12/2007

OTHER PUBLICATIONS

International Search Report for PCT/ES2020/070825 dated Apr. 22, 2021.
Written Opinion for PCT/ES2020/070825 dated Apr. 22, 2021.

* cited by examiner

*Primary Examiner* — Hadi Shakeri
(74) *Attorney, Agent, or Firm* — Sughrue Mion, PLLC

(57)　ABSTRACT

This invention relates to a tyre support device comprising an inclined structure with means for supporting and rotating a tyre at a controlled speed on its axis, avoiding vibrations and deformation thereof during rotation.

16 Claims, 11 Drawing Sheets

TYRE SUPPORT DEVICE

CROSS REFERENCE TO RELATED APPLICATIONS

This application is a National Stage of International Application No. PCT/ES2020/070825 filed Dec. 29, 2020, claiming priority based on Spanish Patent Application No. 20382185.5 filed Mar. 12, 2020.

OBJECT OF THE INVENTION

The invention, tyre support device, relates to a device designed for supporting a tyre and thus enabling its inspection, manually by a user or automated by means of vision systems or devices, enabling its repair, or even enabling trimming or removal of burrs (also manually or automated). The device enables the tyre to be arranged in a specific position, after adjusting to the size of the tyre while the same rotates without longitudinal movement, avoiding deformation and reducing vibration.

The field of application of the present invention falls within the automotive industry sector, specifically focussing on the field of the industry dedicated to the manufacture of apparatuses and devices to carry out tyre manufacturing and/or repairing tasks, and more particularly to tyre inspection tasks, preferably using automated vision systems.

BACKGROUND OF THE INVENTION

Today, as in many other industrial areas, there are tasks that have been automated in such a way that they are performed by machines and robots that are more and more specific, and with increasingly reduced or limited human participation. An example of these are the visual inspection tasks of the tyres, the importance of which is essential for the correct operation and performance of the same, the automated systems being able to provide a much higher level of precision than any human inspection, in addition to reducing errors in inspection and saving time in the same.

In the state of the art, in addition to human tyre inspection, carried out at the end of each tyre manufacturing line, there are different automated inspection systems with vision systems. However, none of the known inspection systems enable the inspection to be carried out in a single station as they require handling and repositioning the tyre during the inspection in order to inspect all the surfaces thereof, namely: tyre tread, tyre interior and sides. The difficulties in handling and positioning the tyres to be inspected derive mainly from their geometry and composition, that is, a circular element made of a soft material, mainly rubber. In addition to the constitution of the tyres, it must be taken into account that it is necessary to inspect all the surfaces completely, hence the tyre must be handled several times to complete the thorough inspection of the same. The constitution of the tyre can cause deformations that limit the precision that said automated inspection systems can offer, thereby losing the effectiveness sought by the same and causing human inspection of the tyres to be still necessary.

For example, document US2011188052 describes an apparatus and method for determining the geometric dimensions of the interior of a tyre and document DE202006011739 relates to a device for controlling wheels, including the wheel, the tyre and the wheel rim.

The objective of the present invention is, therefore, a device that enables the automated inspection of tyres by means of vision systems, without the need to handle the tyre to change its position and access all the surfaces to be inspected and also reduce human participation in the inspection of tyres to reduce possible errors due to the human factor, at the same time that the speed of the inspection is increased, which reduces the manufacturing times of tyres, increasing the quality thereof.

Likewise, in the tyre sector there are other devices for handling tyres for other purposes, such as tyre repair or removal of burrs after manufacture.

These uses for which the device object of the present invention can be used, may or may not require the use of other components such as vision systems or robotic arms that enable the tyre to be handled or the cameras of the vision systems or other tools such as for example blades for the removal of burrs.

Despite knowing the existence of different solutions for automated tyre inspection, usually with vision systems, none of them relate to a support device that makes it possible to adapt to tyres of different dimensions by means of a stable fastening without vibrations and that at the same time makes possible the inspection of the tyre without handling the tyre once it has been arranged on the support device.

DESCRIPTION OF THE INVENTION

The support device for automated inspection with vision systems relates, as noted above, to a device specifically designed with the purpose of supporting a tyre and, preferably enabling its inspection, more preferably with vision systems, avoiding tyre handling and change of position thereof, mainly avoiding the longitudinal movement of the tyre, such that it remains in a single position, although with rotational movement, so as to enable, in the case of inspection thereof, said inspection to be carried out with the tyre in one position, specifically, inclined and resting on its tyre tread with a rotation movement about the tyre axis.

Therefore, the object of the present invention is a tyre support device according to claim 1. Preferably, a tyre support device for automated inspection thereof using vision systems, comprising a frame with an inclined structure with a surface that has a hollow or window and that has on said frame:

At least two adjusting devices for positioning the tyre on the frame, each of said adjusting devices comprising first adjusting means that adapt to the width of the tyre, and placed on second adjusting means that adapt to the diameter of the tyre, so that the adjusting devices adapt to the width of the tyre and to the diameter thereof, the second adjusting means moving on the inclined frame structure, thus making it possible to use the support device with tyres of different dimensions, Support means of a tyre on its tread, or tread surface, associated to the first adjusting means of each adjusting device, and Rotating means of the tyre on its axis, also associated with each adjusting device and that drive said support means.

Said rotation means comprise drive means that enable the turning or rotation of the tyre with a determined and usually constant speed, by means of the transmission of a tangential movement to the tyre.

The support device preferably comprises three adjusting devices on the inclined frame and is supported on a preferably horizontal surface, such that two of the adjusting devices are located on the lower portion of said frame and the third adjusting device is located on the upper surface, all of them concentric to the tyre axis. Associated with said lower adjusting devices, the support device comprises rest or support means for the tyre, which further comprise rotation means that cause the tangential rotation of the tyre on its axis by providing traction on the tyre tread, that is, motorised support and rotation means.

Preferably the device has the three adjusting devices located at 120° from each other, two in the lower portion and one in the upper portion, the three adjusting devices being concentric with respect to the tyre axis.

Likewise, it is also possible that the support device comprises only two adjusting devices located in the lower portion of the frame with the support and rotation means, that is, without the upper adjusting device, so that the tyre rests directly on the frame, or on a support element, in said upper area, and because the rotation and support would be performed on the lower adjusting devices. Alternatively, an upper adjusting device could be provided without resting or support means since said upper adjusting device does not provide traction to the tyre and the main function thereof is to avoid vibrations in the event that they appear. Likewise, an upper adjusting device could be provided with the adjusting means and with the support means but without motorised rotation means.

The frame of the support device where the adjusting devices rest has an inclined structure with a window, so that the frame has the shape of an inclined frame on a support structure of all the elements of the device. The inclination of the frame structure is between 15° and 30°, preferably 20°, with respect to an approximately vertical plane, said approximately vertical plane being preferably perpendicular to the frame support structure and therefore also perpendicular to the surface where said support structure rests, this surface therefore being the one where the whole device rests. That is, the support structure has an inclination of between 60° and 75° with respect to a horizontal surface. The axis of the tyre forms 90° with said support structure on which it rests. The aforementioned inclination of the support structure enables the swinging of the tyre when it rotates to be prevented, swinging that occurs when the tyre is supported on the tread thereof, at the same time resting on a horizontal surface.

Each of said lower adjusting devices, and optionally the upper one, comprises as support means a shaft or roller where the tyre rests, so that the rotation of said shaft constitutes at the same time the rotation means to rotate the tyre on its axis and at the same time support the tyre that prevents deformation when it rotates, the speed of the tyre preferably being between 10 and 15 rpm.

The upper adjusting device has, as support means, preferably two shafts or rollers, not motorised and slightly separated from each other, with the aim of preventing, by forming a stop, the tyre from coming out of the device when applying the corresponding turning speed from the shafts or rollers of the lower adjusting devices.

The first adjusting means for adjusting to the width, the second adjusting means for adjusting to the diameter, as well as the rotation means of each adjusting device are preferably displaced and/or moved by servo motors.

Preferably, the first adjusting means for adjusting to the width of the tyre comprise a first U-shaped support, with a fixed first end and a second end, parallel to the first end, movable by a servo motor, such that the second end can be adapted to the width of the tyre once the tyre tread is inserted into said U-shaped support.

The second adjusting means for adjusting to the diameter of the tyre comprise a second support movable over a surface, preferably with one or two rails arranged in turn on the frame of the device or on an extension thereof, for example, on plates or flat sheets on which displacement rails are arranged. The first support is arranged on said second support with the first adjusting means for adjusting to the width of the tyre. In this way, the second adjusting means will move the second support along the rail or rails located in the frame and, in turn, will move the first adjusting means that are arranged over the second adjusting means.

In a preferred embodiment, the adjusting means for adjusting to the diameter are arranged so as to enable the movement of the adjusting means for adjusting to the width of the tyre along shafts at 120°, maintaining equidistance between the three adjusting devices. The intersection point of said shafts is the point where the centre and axis of the tyre must be placed on the device. That is, the rails are arranged so that the first and second adjusting means, and therefore the adjusting devices, move concentrically with respect to the centre of the tyre that is arranged in the support device. This concentric movement in the upper adjusting device is preferably vertical.

Furthermore, in an alternative construction, where the lower adjusting devices are not at the same distance from each other as the upper adjusting device, the rails on which they move are preferably arranged so that the lower adjusting devices move from one side to the other of the frame, parallel to a horizontal surface, varying the distance between them, while in the case of the upper adjusting device said rails are perpendicular to the previous ones and move from top to bottom.

In addition to the first and second adjusting means, the support device object of the invention comprises support means and rotation means as described above. Said support and rotation means can correspond to the same means, such that the support means and the rotation means are the same drive shaft or roller, which is the case in the lower adjusting devices, where the shaft or roller is arranged preferably on the U-shaped support, between the first end, which is fixed, and the second end, which is movable. Furthermore, and as it has been mentioned, the upper adjusting device may or may not have these support means and rotation means, it may have the support means but not the rotation means, or it may have both. Preferably, as already mentioned, the upper adjusting device has two shafts or rollers as support means.

The device object of the invention can also incorporate, to facilitate access to the interior of the tyre, specifically to the interior of the tyre tread, as well as to the interior of the sides, a mechanism for opening the tyre that is integrated in the lower adjusting devices. Said mechanism, preferably pneumatic, has claws that are inserted in the interior of the tyre from the side thereof and that when opened cause the separation of the sides of the tyre, thus facilitating access to the interior thereof, both to the interior of the tyre tread and to the interior of the sides. Said claws have rollers or cylinders at their ends that enable the tyre to rotate.

The mechanical elements to achieve the movements and adjustments of the previous devices and means may vary, as well as the components that make them up.

In accordance with the above, the support device object of the invention, with three adjusting devices, two lower ones and one upper one, above the previous two, operates as follows:

Firstly, and with the help of a preferably robotic arm, a tyre is placed in the support device, specifically supported on the rotating support shafts, rollers or cylinders of the two lower adjusting devices and being positioned between the three shafts of the three adjusting devices, Next, the second adjusting means for adjusting to the diameter of each one of said adjusting devices are moved to adjust them to the diameter of the tyre, Afterwards, the first adjusting means for adjusting to the width are moved until they adjust to the width of the tyre, and The support and motorised rotation shafts or rollers preferably associated with the lower adjusting devices (if the upper adjusting device also has a support shaft it would also rotate, with or without motorisation) begin to rotate forcing the tyre to rotate, preferably after the actuation of the tyre opening mechanism that distances the sides thereof from each other.

If the device includes a tyre opening mechanism, it will act before activating the rotation of the shafts or rollers of the lower adjusting devices.

The device object of the invention is preferably used for automated tyre inspection, so it will be necessary to have vision systems or display elements, usually cameras and profilometers, to be able to inspect all parts of the tyre, namely:

the tyre tread, the side resting on the support device through the window of the frame or housing, the side that is not resting on the device, and the interior of the tyre, both the interior of the tyre tread and the inner sides.

Preferably, the vision systems will be installed, as far as possible, in the tyre support device itself and when this is not possible because either the handling of the tyre prevents it or the required angle of inclination of the vision system requires it, any necessary means will be used, mainly robotic arms that incorporate said vision systems at their ends.

Preferably, the systems for viewing the outside of the tyre tread, as well as the outside of the sides, are arranged on the upper fastening device, in frames arranged for this purpose. Said frames could be arranged elsewhere as long as they do not interfere with the operation of the device components. For the inspection of the interior of the tyre, vision systems are inserted through the hole of the tyre to access the interior of the tyre tread and the interior of the sides. Access to the interior can be done both from one side of the frame and from the opposite side through the hollow or window made therein.

For the inspection of a tyre with vision systems, it would be preferable to proceed as follows:

a) Before placing the tyre on the support device, a reader measures the volume of the tyre to be inspected to know the dimensions thereof, b) The tyre is taken from the inside thereof by means of clamps by a robotic arm and moved to a barcode reader in order to verify that the manufacturing dimensions, included in the barcode, coincide with the volume measured in step a), and in the event that they do not coincide, the tyre inspection is ruled out, c) The tyre is placed on the support device object of the invention, such that the clamping devices thereof move to adjust to the diameter and width of the tyre.

d) The tyre opening mechanism, incorporated into the lower adjusting devices, separates the sides of the tyre, e) The rollers or shafts of the support means of the lower adjusting devices begin to roll and cause the tyre to move, f) The vision systems arranged on the support device, preferably on the upper clamping device, start capturing images of the outside of the tyre tread, of one outer side of the tyre and the other outer side of the tyre, one of them through the hollow or window existing in the inclined frame of the device object of the invention, g) Vision systems arranged in robotic arms, specifically those intended to inspect the interior of the tyre, specifically one to inspect the interior of the tyre tread, another to inspect the interior of one side and another to inspect the interior of the other side, access the inside of the tyre, and h) After inspection of the different parts of the tyre, the captured images are stored, processed and compared with reference images of the inspected tyre, thus determining the viability of the inspected tyre.

As mentioned above, in the event that the device was not used for automatic tyre inspection, but for any of the other functions indicated above, the steps related to inspection with vision systems would not be included in the method. Also, if the device did not include the tyre opening mechanism, this step will obviously not be included in the method either.

DESCRIPTION OF THE DRAWINGS

To complement the present description and in order to facilitate the understanding of the features of the invention, the following figures are included by way of illustration and not limitation.

PREFERRED EMBODIMENT OF THE INVENTION

In view of the aforementioned figures, a description is given below of a first non-limiting exemplary embodiment of the support device for automated inspection of tyres, preferably by means of vision systems of the invention.

Figure 1:
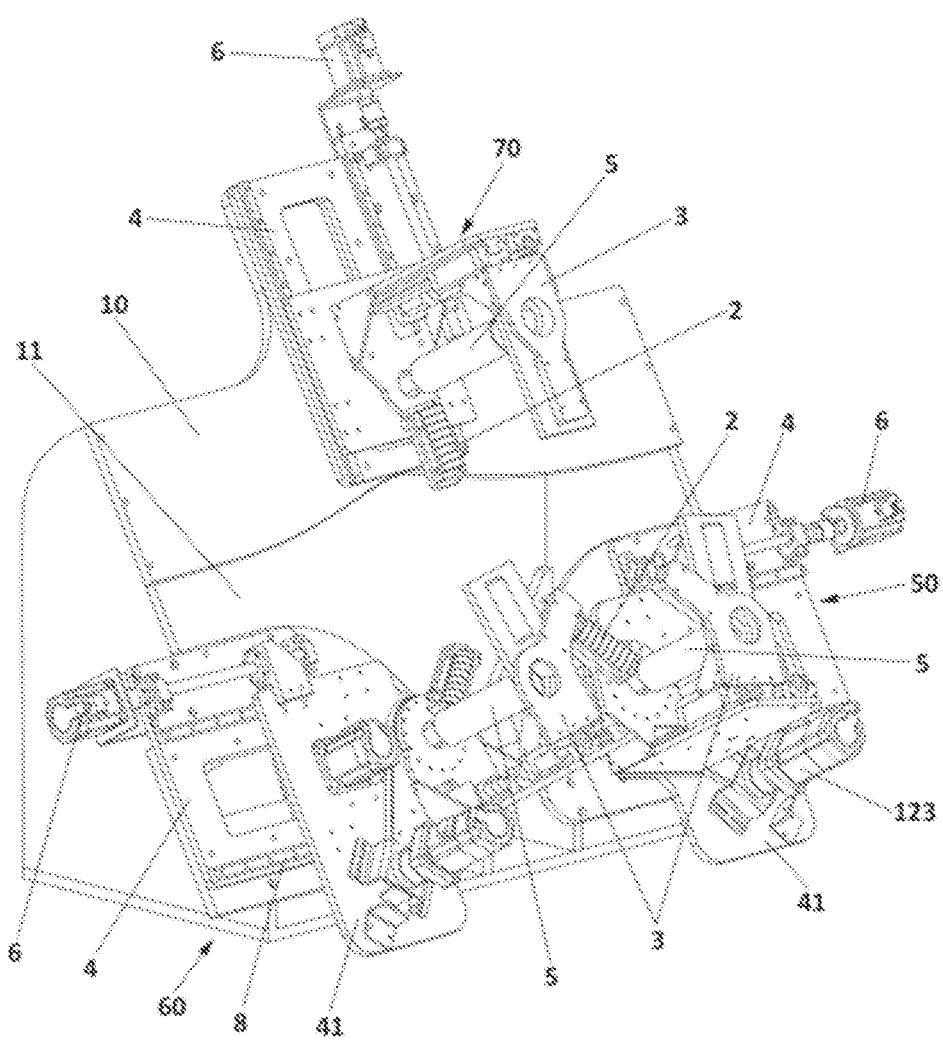
FIG. 1 shows a front perspective view of a first exemplary embodiment of the tyre support device object of the invention, where the general configuration thereof and the main parts and elements it comprises can be seen.

Thus, as seen in FIG. 1, the support device comprises an inclined frame (10), which can be arranged on a support structure (not shown), preferably supported on a horizontal surface, with:

three adjusting devices, two lower ones (50, 60) and one upper one (70), the lower ones being equidistant with the upper adjusting device, and each of the three adjusting devices comprising first adjusting means for adjusting to the width (3) of the tyre and second adjusting means for adjusting to the diameter (4) of the tyre, and which incorporates support means (5) in its three adjusting devices and rotation means in the lower adjusting devices (50, 60) for supporting and rotating a tyre at a controlled speed on its axis, between 10 and 15 rpm, avoiding vibrations and deformation thereof during rotation, said first (3) and second (4) adjusting means of the three adjusting devices (50, 60, 70), as well as the rotation means of the lower adjusting devices (50, 60) preferably being displaced and/or moved in a controlled manner by servo motors (6).

The frame (10) has an inclined structure with a central window or hollow (11), preferably in the shape of a housing, the inclination of the structure preferably being close to 20°, between 15° and 30°, with respect to a perpendicular to a supporting horizontal surface. On said inclined frame or structure (10) the three adjusting devices (50, 60, 70) are arranged, the two lower adjusting devices (50, 60) having first adjusting means for adjusting to the width (3), second adjusting means for adjusting to the diameter (4) of the tyre and support means (5) of the tyre that coincide with the motorised rotation means of the tyre on its axis, specifically rollers or cylinders (5).

The upper adjusting device (70) preferably further has adjusting means (3, 4) as well as the above support means (5) present in the two lower adjusting devices (50, 60), although preferably it does not have motorised rotation means, such that the support means (5) of the upper adjusting device (70) rotate due to the traction transmitted by the rotating tyre itself due to the action of the motorised rotation means (5) of the lower adjusting devices (50, 60).

Alternatively, the support device object of the invention may not have (not shown) any upper adjusting device (70), such that the tyre would rest directly on the upper portion of the frame (10) or on a roller or rollers arranged for this purpose on the frame (10).

Each of the lower adjusting devices (50, 60) comprises, as support means (5) and rotation means, a shaft, roller or cylinder (5) that performs said support and rotation functions of the tyre, said shaft, roller or cylinder (5) being motorised to be able to transmit that rotation to the tyre. Said shaft, roller or cylinder (5) is perpendicular to the frame (10) and constitutes the means for supporting and rotating the tyre on its very axis since the tyre rests on said support and rotation shafts or rollers (5) of the lower adjusting devices (50, 60). In the case of the upper adjusting device (70), if the same does not exhibit rotation means, it is possible that it exhibits at least one shaft, roller or cylinder, as support means (5), which will also rotate dragged by the tyre. The shafts, rollers or cylinders of the support means (5) of the adjusting devices (50, 60, 70) are parallel to each other.

As mentioned, preferably, said three adjusting devices (50, 60, 70) are incorporated into said frame (10) arranged in such a way that the two lower adjusting devices (50, 60) are located in the lower portion of the frame, (10) with their support and rotation shafts (5) separated and horizontally movable, and the upper adjusting device (70) is arranged on the upper portion of the frame (10) equidistant, at all times, to both lower adjusting devices (50, 60).

Figure 2:
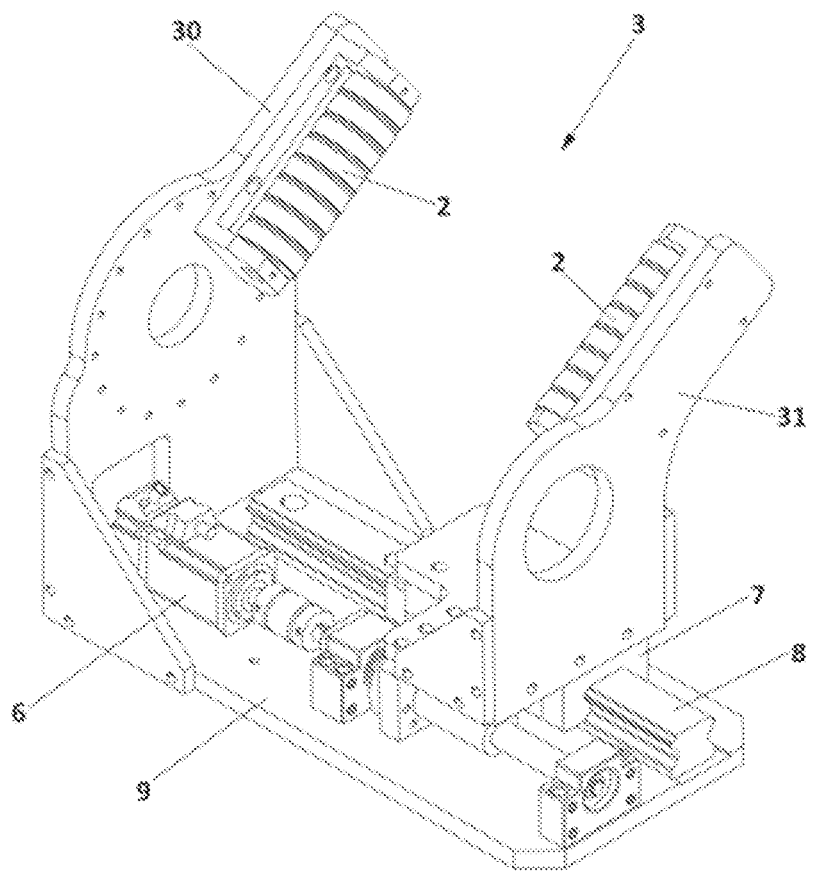
FIG. 2 shows a perspective view of one of the arm structures that the three adjusting assemblies for adjusting the support device of the first example of the invention have as adjusting means for adjusting to the width of the tyre, the parts and elements it comprises being appreciated in detail.

FIG. 2 shows the first adjusting means for adjusting to the width (3) which includes each adjusting device (50, 60, 70) and which are preferably determined by a U-shaped structure formed by two arms, one fixed (30) and one movable (31) (although they could be both movable), said structure moving on a runner (7) associated with a servomotor (6) and inserted into a rail (8) of a base plate (9), such that the movable arm (31) moves closer and further away from the fixed arm (30) to adjust to the width of the tyre.

Furthermore, preferably, in the inner portion of each arm (30, 31), the incorporation of a series of bearings (2) is envisaged, which are attached to the lateral surface of the tyre, rolling with it when turning it so as not to cause friction.

Figure 3:
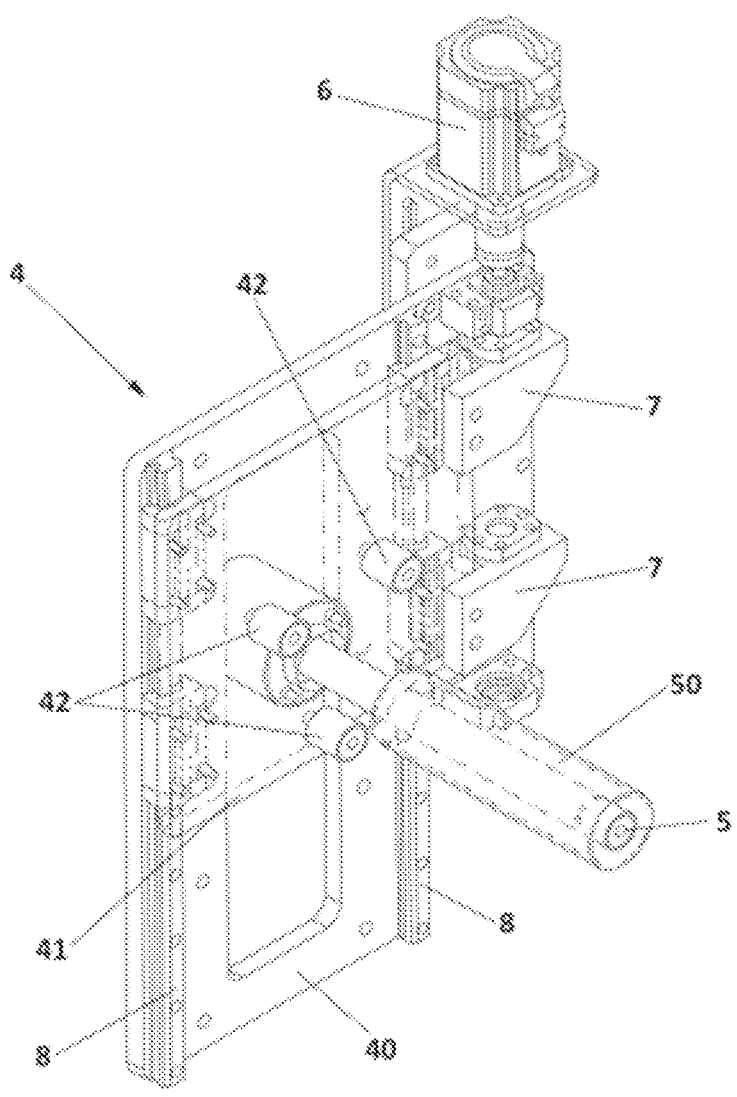
FIG. 3 shows a perspective view of the adjusting means for adjusting to the diameter of the tyre of the upper adjusting assembly of the support of the first example of the invention, depicted without the arm structure to facilitate the observation of the elements it comprises and the arrangement thereof.
Figure 4:
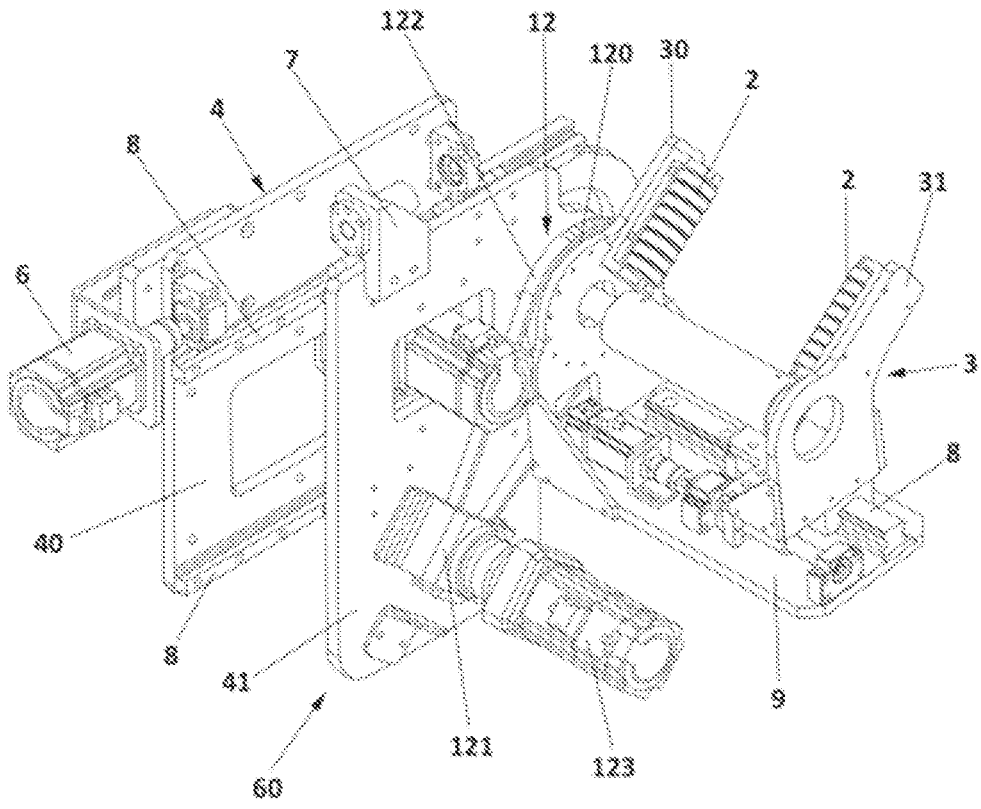
FIG. 4 shows a perspective view of one of the lower adjusting assemblies that the support device has, with the adjusting means for adjusting to the width and diameter of the tyre, according to the first example of the invention, the different elements it comprises and the arrangement thereof being seen.

Also, between both arms (30, 31) there is the support and rotation shaft (5) with a roller (32) on which the tyre tread rests, as seen in FIGS. 1, 3 and 4.

Furthermore, the second adjusting means for adjusting to the diameter (4), shown in FIG. 3, of the adjusting devices (50, 60, 70) comprise a support plate (40) which, integrally attached to the frame (10) of the support device, is provided with rails (8) on which runners (7) move along, associated with a servomotor (6), and on which a movable plate (41) is fixed on which, in turn, the U-shaped arms structure (30, 31) of the first adjusting means (3) is coupled with the corresponding support and rotation shaft (5) of the support means (5), to move said movable plate (41) from one end to the other of said support plate (40) and adjust the position thereof to the diameter of the tyre.

FIG. 3 shows how said second adjusting means for adjusting to the diameter (4), for the upper adjusting device (70), exhibit a vertical displacement movement of the movable plate (41), the support and rotation shaft (5), which rotates freely, being fastened directly to said plate (41), there being in said plate (41) spacers (42) on which the U-shaped arm structure (30, 31) of the first adjusting means (3) rests.

For its part, as seen in FIG. 1, in the two lower adjusting devices (50, 60), the movable plate (41) exhibits a horizontal displacement movement, the support and rotation shafts (5) being drive rollers or cylinders. In an example of FIG. 4, the rotation system of said rollers 5 can be made up of a servo motor (123) associated with a belt (122) associated with a planetary gear reduction system (12) formed by a rotating plate (120) and a pinion (121), in order to transmit the movement from the servomotor (123) to the roller (5). Other systems could also be used.

FIGS. 5 to 8 show a second exemplary embodiment of the invention. This second example shows a tyre (N) support device comprising an inclined frame (10) with a window or hollow (11) and arranged on a support structure (12). Said support device comprises:

three adjusting devices (50, 60, 70), two lower ones (50, 60) and an upper one (70), the three devices (50, 60, 70) being equidistant from each other and concentric to the tyre axis, located on three shafts at 120° and intersecting at the axis (n) of the tyre, which is perpendicular to the frame (10) and comprise first adjusting means (3) for adjusting to the width of the tyre and second adjusting means (4) for adjusting to the diameter of the tyre, and which incorporates support means (5) in the three devices (50, 60, 70) to support the tyres and rotation means exclusively in the lower devices (50, 60) for supporting and rotating the tyre (N) at a controlled speed on its axis, preferably between 10 and 15 rpm, avoiding vibrations and deformation thereof during rotation due to the configuration of the support device, said first (3) and second (4) adjusting means and rotation means (5) preferably being displaced and/or moved in a controlled manner by servomotors (6).

The main difference, among others, between this second exemplary embodiment and the first exemplary embodiment is that the adjusting devices (50, 60, 70) are arranged, as mentioned, on adjusting means for adjusting to the diameter (4) that serve to adjust the devices to the diameter of the tyre and stabilise the tyre, such that they move in parallel to axes at 120° that intersect at a point located on the axis (n) of the tyre arranged on the support device (10) object of the invention.

Also, another difference with the first exemplary embodiment of the invention is that this second example has an opening mechanism (80) of the tyre integrated in each of the lower adjusting devices (50, 60). This mechanism (80), which could also be integrated in the first exemplary embodiment, aims to facilitate access to the interior of the tyre, specifically to the interior of the tyre tread, as well as to the interior of the sides. Said mechanism (80), preferably actuated by pneumatic means, has claws (81) that are inserted inside the tyre (N) through the side thereof and when opened cause the separation of the sides of the tyre (N), thus facilitating access to the interior of the same, both to the interior of the tyre tread and the interior of the sides. Said claws (81) have at their ends rollers or cylinders (82) that enable the tyre to rotate when the support and rotation means (5) arranged in the lower adjusting devices (50, 60) cause the rotation of the whole tyre.

In this example, the adjusting means for adjusting to the diameter (4) of the three adjusting devices (50, 60, 70) move, as mentioned, radially with respect to the centre of the tyre, each device maintaining equidistance with respect to the others as they approach or move away from the centre of the tyre depending on the dimensions thereof. The adjusting means for adjusting to the width (3) also move on said adjusting means for adjusting to the diameter.

Said adjusting means for adjusting to the width (3) have a configuration similar to that described for the first exemplary embodiment, wherein a first movable arm moves with respect to a second fixed arm, both arms being parallel and having bearings to facilitate the rotation of the tyre.

Likewise, the tyre rests on two arranged shafts, rollers or cylinders that form the support means (5), said support means being motorised and activated by servomotors (123) in the case of the lower adjusting devices (50, 60). However, in the upper adjusting device (70) the support means (5) are not motorised, but have a double support system formed by two rollers that are distanced from each other, acting as a stop and preventing the tyre from coming out of the support device as a result of the rotation. Likewise, it is possible to have support rollers (51), without motorisation, in the device, between the upper adjusting device (70) and the lower adjusting devices (50, 60).

Those elements not described in this second exemplary embodiment of FIGS. 5 to 8 can be considered similar or equivalent to those described for the first example of FIGS. 1 to 4.

Figure 5:
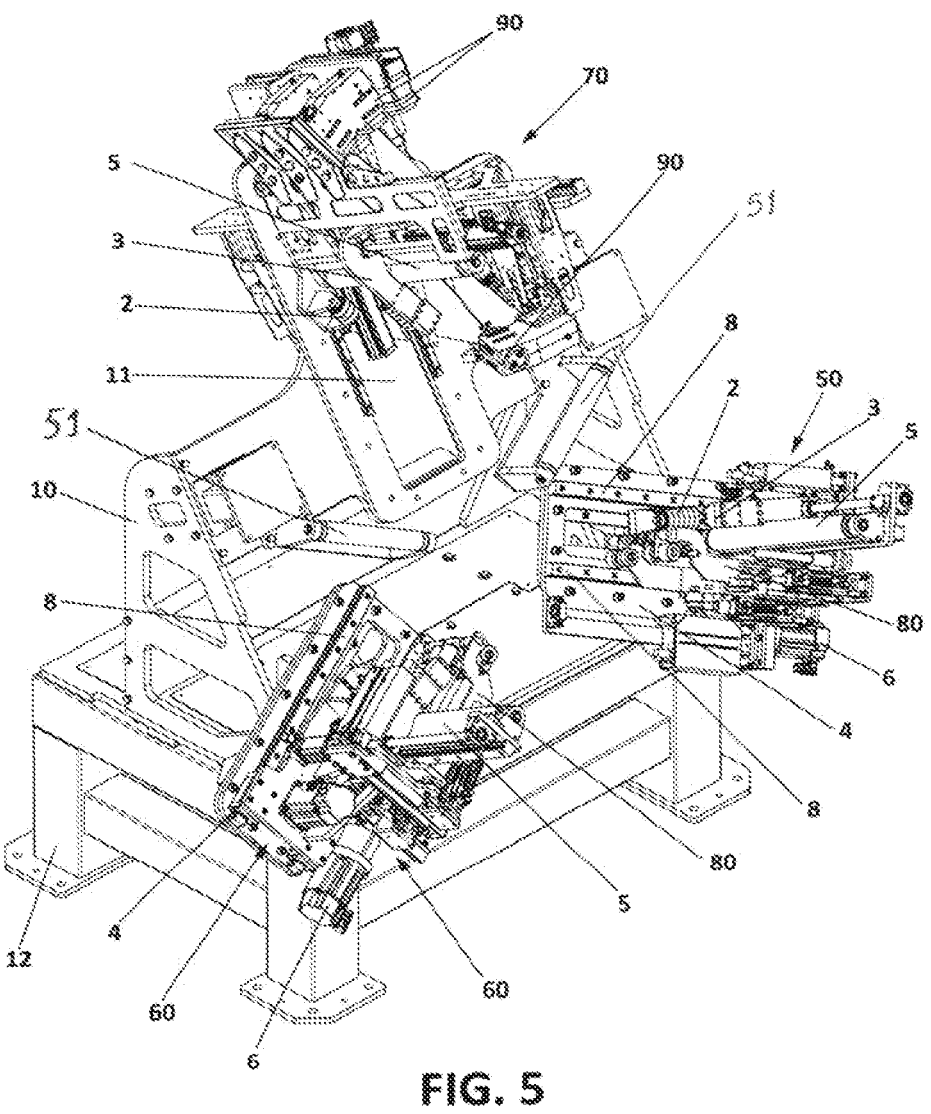
FIG. 5 shows a second exemplary embodiment of the device object of the invention.
Figure 6:
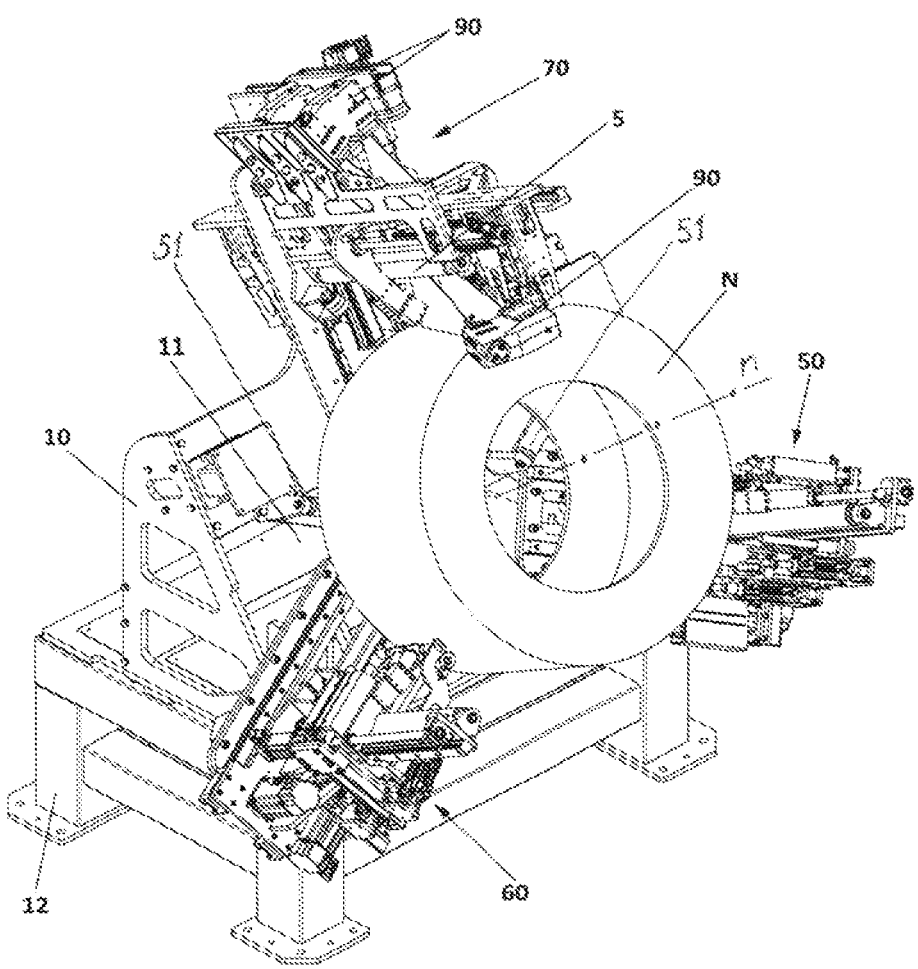
FIG. 6 shows said second exemplary embodiment with a tyre arranged on the support.
Figure 7A:
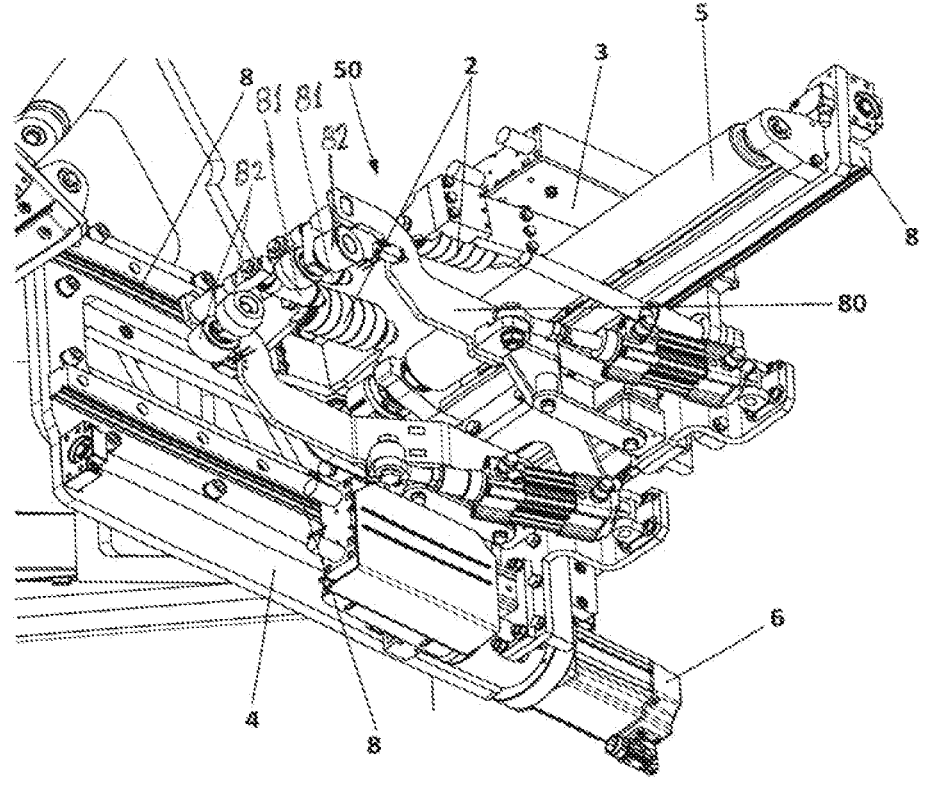
FIG. 7A shows a view of a lower adjusting device with the different means that make it up.
Figure 7B:
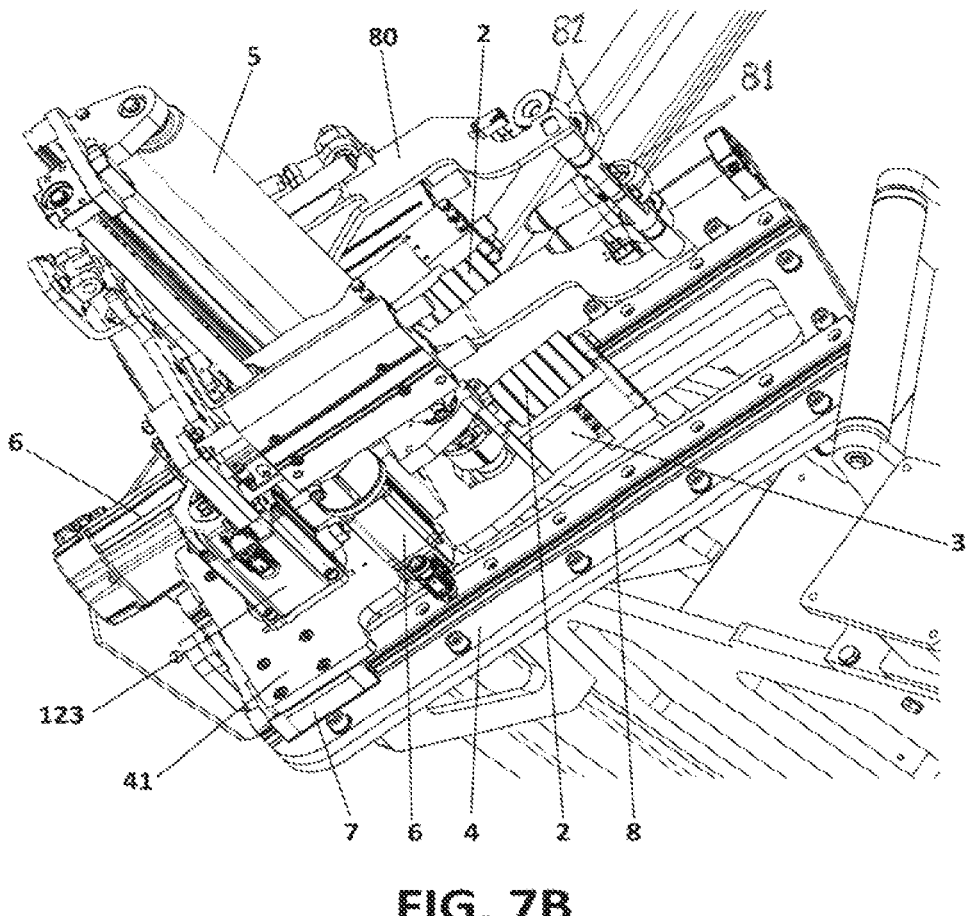
FIG. 7B shows another view of the lower adjusting device with the different means that make it up.
Figure 7C:
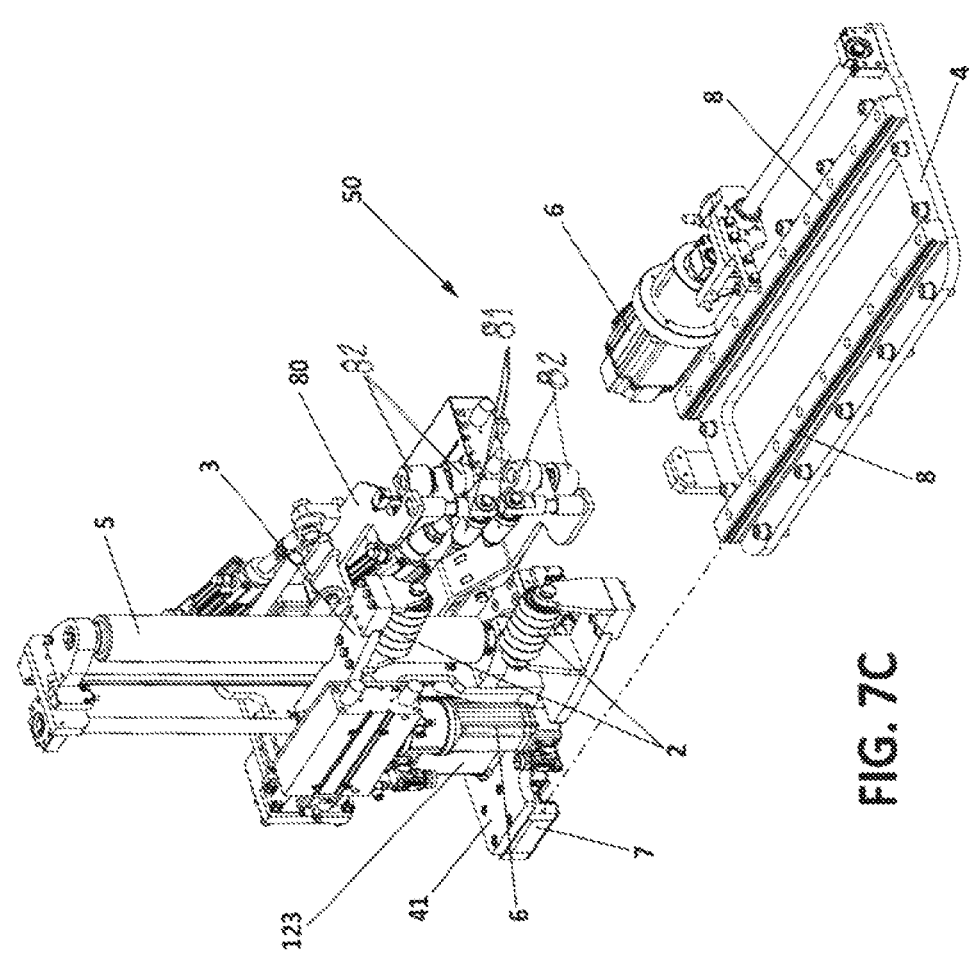
FIG. 7C shows a first exploded view of the lower adjusting device of FIGS. 7A and 7B, where the rails for adjusting to the diameter of the tyre have been separated from the assembly.
Figure 7D:
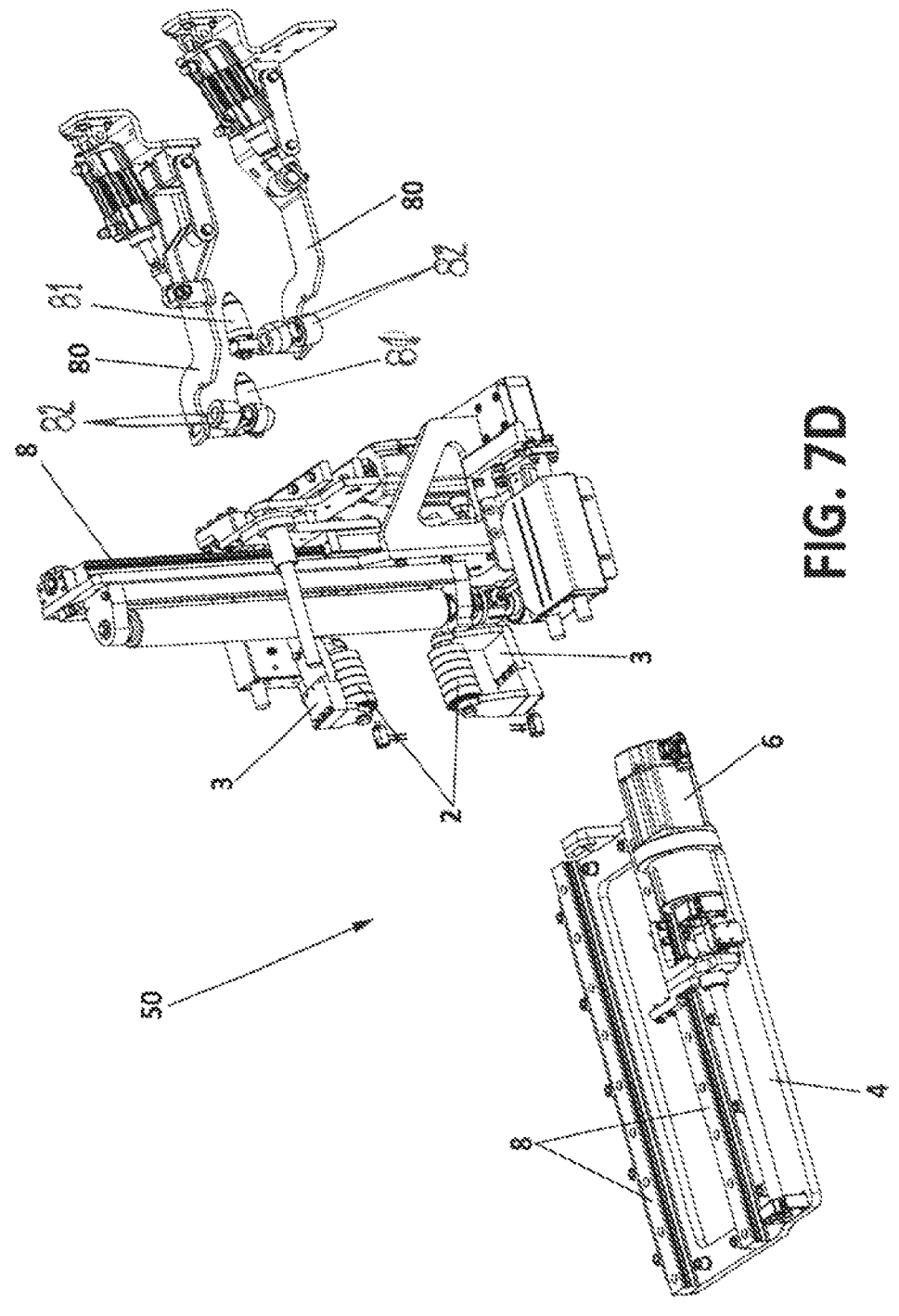
FIG. 7D shows a second exploded view of the same adjusting device, in which the adjusting means for adjusting to the diameter, the adjusting means for adjusting to the width and the opening mechanism of the tyre (from left to right) are observed.
Figure 8:
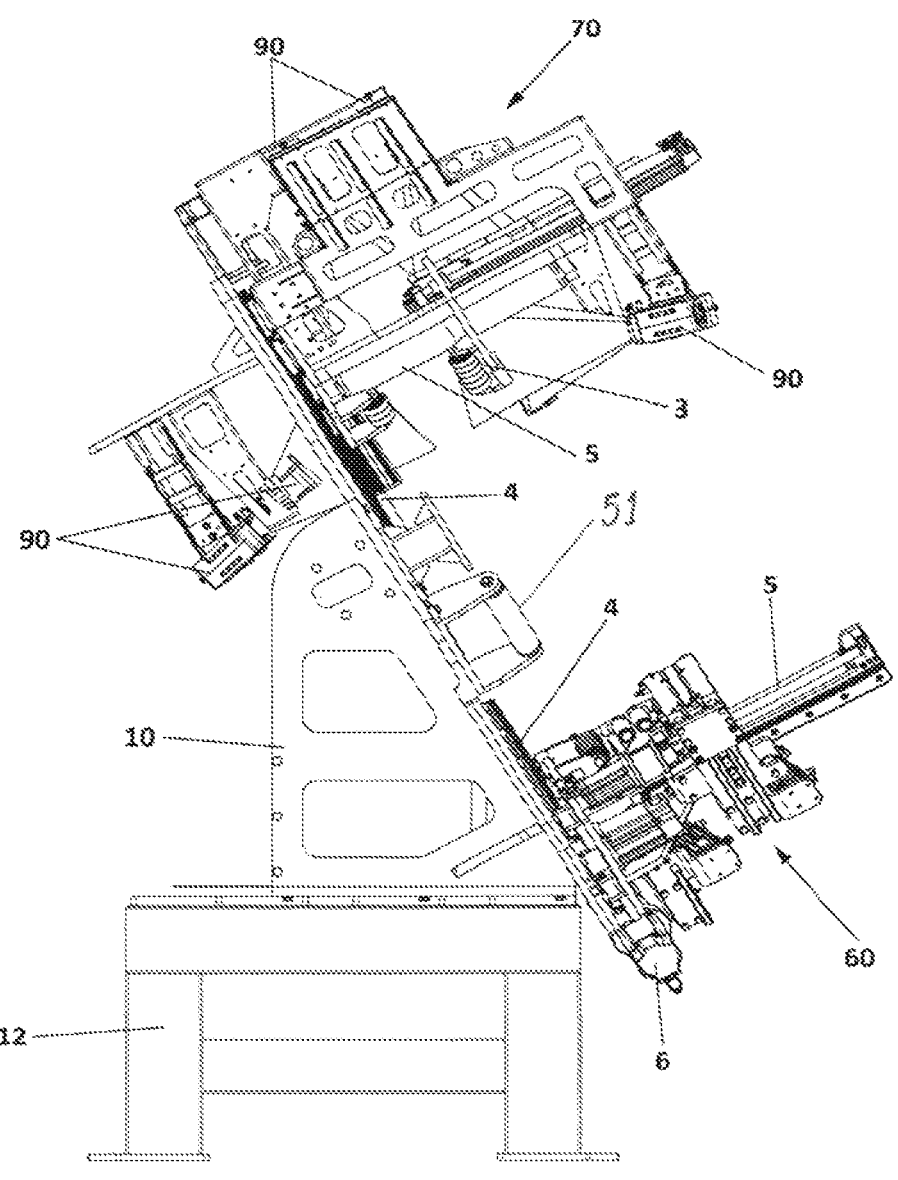
FIG. 8 shows a side view of the device object of the invention

This second example further shows how the upper adjusting device (70) integrates vision systems (90) formed by a camera or profilometer and a laser. Specifically, in FIG. 8, although they are also seen in FIGS. 5 and 6, there are several vision devices or systems (90), two located in the upper portion to capture and record the tyre tread and two others located on each side of the tyre, capturing the sides thereof. It can be seen how the side of the tyre located on the side of the support device (10) is inspected by a vision system (90) that accesses said side through the window or hollow (11) of the frame (10). Likewise, the light beams emitted by the necessary laser devices are observed so that the cameras or profilometers capture the surface with sufficient resolution.

The method of inspection of a tyre with vision systems with the device object of the present invention, in particular with the second example described, would preferably proceed as follows:

a) Before placing the tyre (N) in the support device (10), a reader measures the volume of the tyre (N) to be inspected to know the dimensions thereof, b) The tyre (N) is taken from the inside thereof by means of clamps by a robotic arm and moved to a barcode reader in order to verify that the manufacturing dimensions, included in the barcode, coincide with the volume measured in step a), and in the event that they do not coincide, the tyre inspection (N) is ruled out, c) The tyre (N) is placed on the support device (10) object of the invention, so that the clamping devices (50, 60, 70) thereof move to adjust to the diameter and width of the tyre (N).

d) The tyre opening mechanism (80), incorporated into the lower adjusting devices (50, 60), separates the sides of the tyre (N), e) The rollers or shafts (5) of the support means of the lower adjusting devices (50, 60) begin to roll and cause the tyre (N) to move, f) The vision systems (90) arranged on the support device (10), preferably on the upper clamping device (70), begin capturing images of the outside of the tyre tread, of an outer side of the tyre (N) and the other outer side of the tyre (N), one of them through the hollow or window (11) in the inclined frame (10) of the device object of the invention, g) Vision systems arranged in robotic arms, specifically those intended to inspect the interior of the tyre (N), specifically one to inspect the interior of the tyre tread, another to inspect the interior of one side and another to inspect the inside of the other side, access the inside of the tyre (N), and h) After inspection of the different parts of the tyre (N), the captured images are stored, processed and compared with reference images of the tyre (N) inspected by means of a computer program installed in a processor that collects all the images and data, thus determining the viability of the inspected tyre.

The invention claimed is:

1. A tyre support device comprising a frame that has an inclined structure for supporting a tyre (N) with a hollow or window, providing on said inclined structure at least two adjusting devices for positioning the tyre (N) on the frame, the at least two adjusting devices including two lower adjusting devices located in a lower portion of the frame separated from each other and an upper adjusting device located in the upper portion of the frame, each of said adjusting devices comprising:

second adjusting means, that move on the inclined structure of the frame for adapting to the diameter of the tyre (N), first adjusting means, placed on said second adjusting means, to displace along the same second adjusting means to adapt to the width of the tyre (N), and support means for supporting the tyre (N) on its tread surface, driven by rotating means that make the support means rotate to make the tyre (N) rotate on its axis, wherein the second adjusting means move on the inclined structure to adapt to the diameter of the tyre (N), simultaneously positioning the first adjusting means and the support means placed on said second adjusting means, so that the support means make the tyre (N) rotate after the first adjusting means adapt to the width of the tyre (N).

2. The device, according to claim 1, wherein the inclined structure is inclined between 15° and 30°, with respect to a vertical plane that is perpendicular to the support surface of the frame.

3. The device according to claim 1, wherein the adjusting devices are equidistant from each other arranged on shafts located at 120°.

4. The device according to claim 1, wherein the rotation means are the support means.

5. The device according to claim 1, wherein the support and rotation means are at least one roller located on a rotation axis perpendicular to the inclined structure of the frame.

6. The device according to claim 1, wherein the first adjusting means and the second adjusting means are activated by servo motors.

7. The device according to claim 1, wherein the first adjusting means for adjusting to the width of the tyre comprise a U-shaped structure formed by two arms, one fixed and one movable such that the movable arm moves closer and further away from the fixed arm to adjust to the width of the tyre.

8. The device according to claim 7, wherein each of the arms comprise bearings in the inner portion attached to the lateral surface of the tyre, rolling with the lateral surface when turning the tyre so as not to cause friction.

9. The device according to claim 8, wherein the second adjusting means for adjusting to the diameter of the tyre in the upper adjusting device exhibit a vertical displacement movement of the movable plate.

10. The device according to claim 8, wherein the second adjusting means for adjusting to the diameter to the tyre in the lower adjusting devices exhibit a horizontal displacement movement of the movable plate.

11. The device according to claim 1, wherein the second adjusting means for adjusting to the diameter of the tyre comprise a support plate which, integrally attached to the frame of the support device, and on which a movable plate is fastened on which, in turn, the U-shaped arms structure is coupled with the corresponding support and rotation means, to move said movable plate from one end to the other of the mentioned support plate and adjust the position thereof to the diameter of the tyre.

12. The device according to claim 1, wherein the support means of each of the adjusting devices comprise a support and rotation shaft, in which a support and rotation shaft of the upper adjusting device rotates freely and a support and rotation shafts of the lower adjusting devices are drive shafts activated by servo motors.

13. The device according to claim 1, wherein the lower adjusting devices comprise a tyre opening mechanism with at least two claws that are inserted inside the tyre separating the sides of the tyre.

14. The device, according to claim 1, wherein the inclined structure is inclined at 20° with respect to a vertical plane that is perpendicular to the support surface of the frame.

15. The device according to claim 1, wherein the first adjusting means for adjusting to the width of the tyre comprise a U-shaped structure formed by two arms, one fixed and one movable such that the movable arm moves closer and further away from the fixed arm to adjust to the width of the tyre, and wherein the second adjusting means for adjusting to the diameter of the tyre comprise a support plat which, integrally attached to the frame of the support device, and on which a movable plate is fastened on which, in turn, the U-shaped arms structure is coupled with the corresponding support and rotation means, to move said movable plate from one end to the other of the mentioned support plate and adjust the position thereof to the diameter of the tyre.

16. The device according to claim 13, wherein the at least two claws comprise rollers at ends thereof that are inserted into the tyre and enable the tyre to rotate when the support and rotation means in the lower adjusting devices cause the rotation of the tyre.

\* \* \* \* \*